Figure 1:
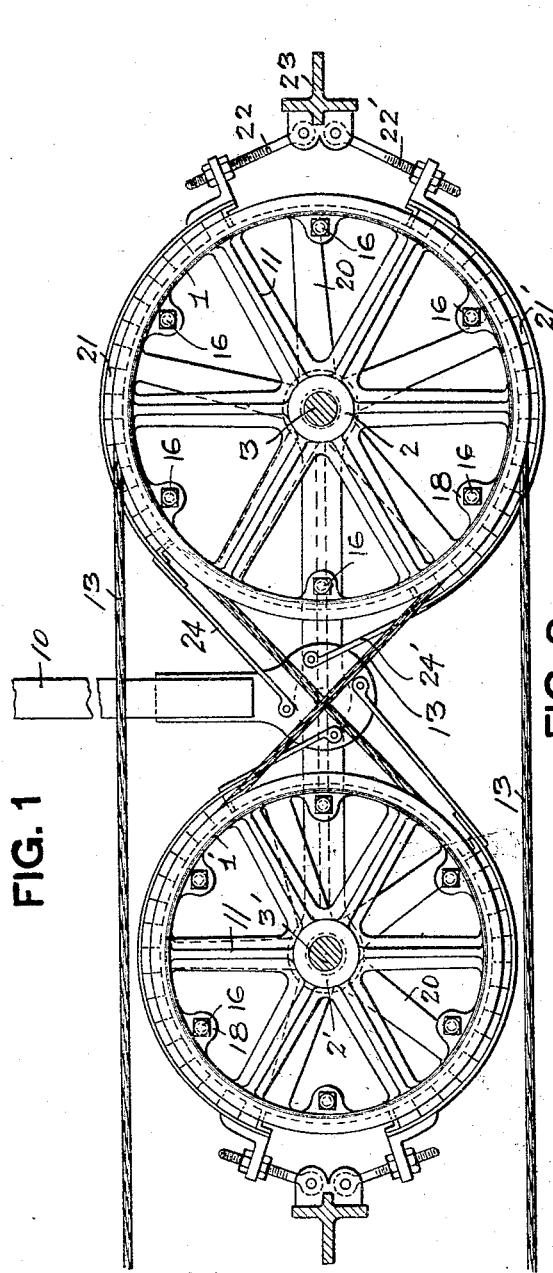

J. C. STINE.
BRAKE BAND WHEEL.
APPLICATION FILED APR. 27, 1911.

1,197,871.

Patented Sept. 12, 1916.

WITNESSES.
J. R. Keller
Robert C. Totten

INVENTOR.
Joseph C. Stine
By Kay & Totten
Attorneys

UNITED STATES PATENT OFFICE.

JOSEPH C. STINE, OF TYRONE, PENNSYLVANIA.

BRAKE-BAND WHEEL.

1,197,871.

Specification of Letters Patent.  Patented Sept. 12, 1916.

Application filed April 27, 1911. Serial No. 623,783.

*To all whom it may concern:*

Be it known that I, JOSEPH C. STINE, a citizen of the United States, and resident of Tyrone, in the county of Blair and State of Pennsylvania, have invented a new and useful Improvement in Brake-Band Wheels; and I do hereby declare the following to be a full, clear, and exact description thereof.

My invention relates to band wheels or rims for drums or power pulleys, and especially those employed in gravity operated or positively driven load moving devices such as inclined planes. Its object is to provide an improved construction of wheels of this nature which admits of ready adjustment in the size of friction surface to enable the handling of varying loads, and which is at the same time of stronger and more durable construction than the devices hitherto in commercial use, and which obviates the side thrust on the machinery in such devices, causing great wear and accidents thereto.

My invention is primarily applicable to the drums or band wheels employed in inclined planes, and I shall describe and illustrate an embodiment of it as applied thereto, although it will be understood that I do not intend thereby to limit my invention entirely to this type of machinery, but that it is capable of modification to suit various uses within the scope of its construction, as defined in the accompanying claim. In load raising and lowering machinery of this type previously in use, the load is usually connected to a belt or series of lines carried around the main or power rim of one or a pair of wheels which are provided with brake band extensions on which the brake bands of the friction controlling device play; in the case of a gravity operated apparatus, the main drum being journaled on the carrying shaft. This construction, while it admits of varying the width of brake band if the band rim be removably fastened to the drum proper, constitutes a poorly balanced machine subject to great shearing and bending strain, and where a heavy load is to be moved and therefore a wide rim required, there has always been a liability of crushing the rim or tearing it from the drum, as well as continuous uneven wear on the journal portion of the shaft within the hub of the drum.

By my invention, I contemplate the provision of a band wheel or power wheel provided with a hub or journal portion on the shaft combined with a brake band rim extending sidewise from the band wheeel and provided with a hub on the shaft. The two hubs are each journaled on the shaft in the case of gravity load moving devices, but they may also be fastened or keyed thereto where the device is employed with a power driven inclined plane or similar apparatus; the band wheel being in all cases preferably removably attached to the drum wheel as by bolts connecting the band rim thereto, and also having preferably its hub or journal portion extending along the shaft or axle for only a limited distance opposite to the drum wheel hub, the said band wheel hub being preferably connected by spokes to its rim so as to provide a light as well as a perfectly balanced construction.

Figure 2:
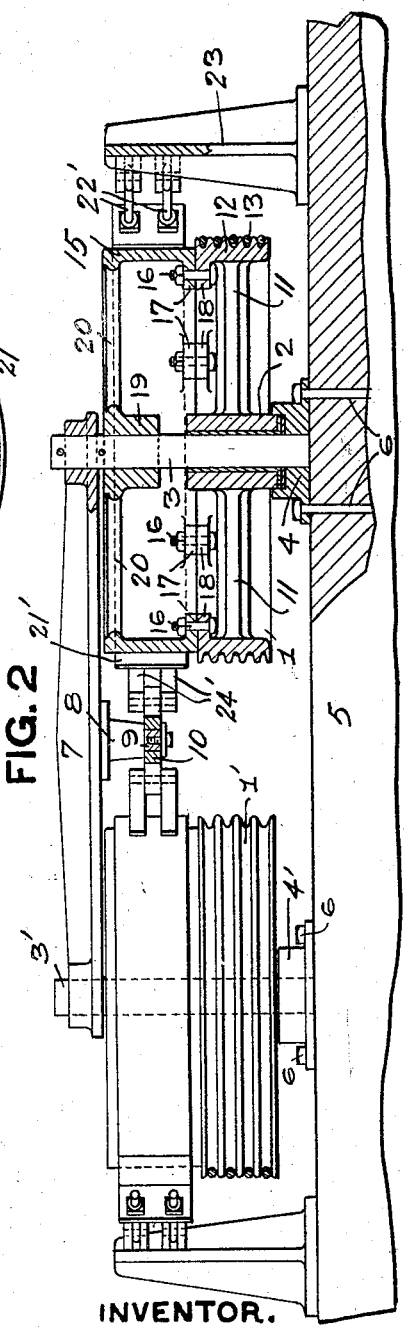

In the accompanying drawings Figure 1 is a top plan view of a pair of drums illustrating my invention, and Fig. 2 is a side view partly in vertical section of the same.

The drums 1 and 1' illustrated in the said figures are for present purposes identical in construction, and will not be separately specifically described. These drums are provided with the hub portions 2, 2', respectively, journaled on the shafts 3, 3', which are carried in the bearing blocks 4, 4', respectively, the said blocks being anchored to the bed 5 of the machine in any suitable fashion as by the bolts 6 illustrated. The opposite ends of the shafts 3, 3' are usually journaled in, or if desired, in the case of a gravity apparatus fastened within the end portions of the beam 7 which carries centrally the bearing bracket 8 on the pivot 9 to which is fulcrumed the brake lever 10.

The drum 1 is provided with the spokes 11, a grooved rim portion 12 about which the line or rope 13 is carried in a manner well understood in the art. In accordance with my invention the brake band rim 15 is attached sidewise of the drum 2, preferably by the bolts 16 extending through the inwardly extending flange 17 of the band rim 15 and a like flange or extension 18 of the rim 12 of the drum 2. The band rim 15 is provided with the hub 19 journaled near the opposite end of the shaft 3 to the hub 2 and connected to the outer portion of the band rim 15 by the integral struts or spokes 20, as illustrated clearly in Fig. 2. The band rim 15 is embraced by the brake bands 21, 21' attached at their one ends by the ties 22, 22' to the bracket 23, and connected at their opposite ends by the tightened rods 24, 24' to the brake lever 10 in the usual manner.

The brake band rim 15 together with the spokes 20 and hub 19 forms in one sense in itself a brake wheel separately journaled on the shaft 3; although in combination with the drum 1 provided with the hub 2 oppositely disposed to the hub 19 it forms a complete driving and brake control wheel which is perfectly balanced so as to carry both the crushing stresses of the brakes 21, 21' and the pulling or bending stresses of the load line 13 on the shaft 3 in a mechanical manner without undue tendency to wear on the journaled parts in contact. As machines of this nature are often required to carry varying or greatly increased loads, it is often desirable to increase the size of the brake surface without providing a complete new plant. By my invention the band rim 15 can be removed and a new band rim wheel with a wider rim be substituted in a short time without altering or removing the load carrying drums, so as to provide an ample friction surface without any tendency, however, to crushing of the band wheel or stripping of the threads in the connecting bolts between the same and the drum.

What I claim is:

In machines of the character described, the combination with a shaft, a load-carrying wheel provided with a hub mounted on said shaft, spokes extending from said hub, the load carrying rim carried centrally by said spokes; of a brake wheel comprising a separate hub mounted on said shaft at a distance from said first hub, spokes extending from the outer end of said hub, a brake band rim carried by said spokes, said spokes being at the outer edge of said rim and the inner edge of said rim being affixed to the rim of the load carrying wheels.

In testimony whereof, I the said JOSEPH C. STINE have hereunto set my hand.

JOSEPH C. STINE.

Witnesses:
D. P. MILLER,
C. IMHOF.

Copies of this patent may be obtained for five cents each, by addressing the "Commissioner of Patents, Washington, D. C."